Oct. 21, 1924.
D. VAN ALSTYNE
CAST METAL WHEEL
Filed June 14, 1923
1,512,433
- FIG. 1 -
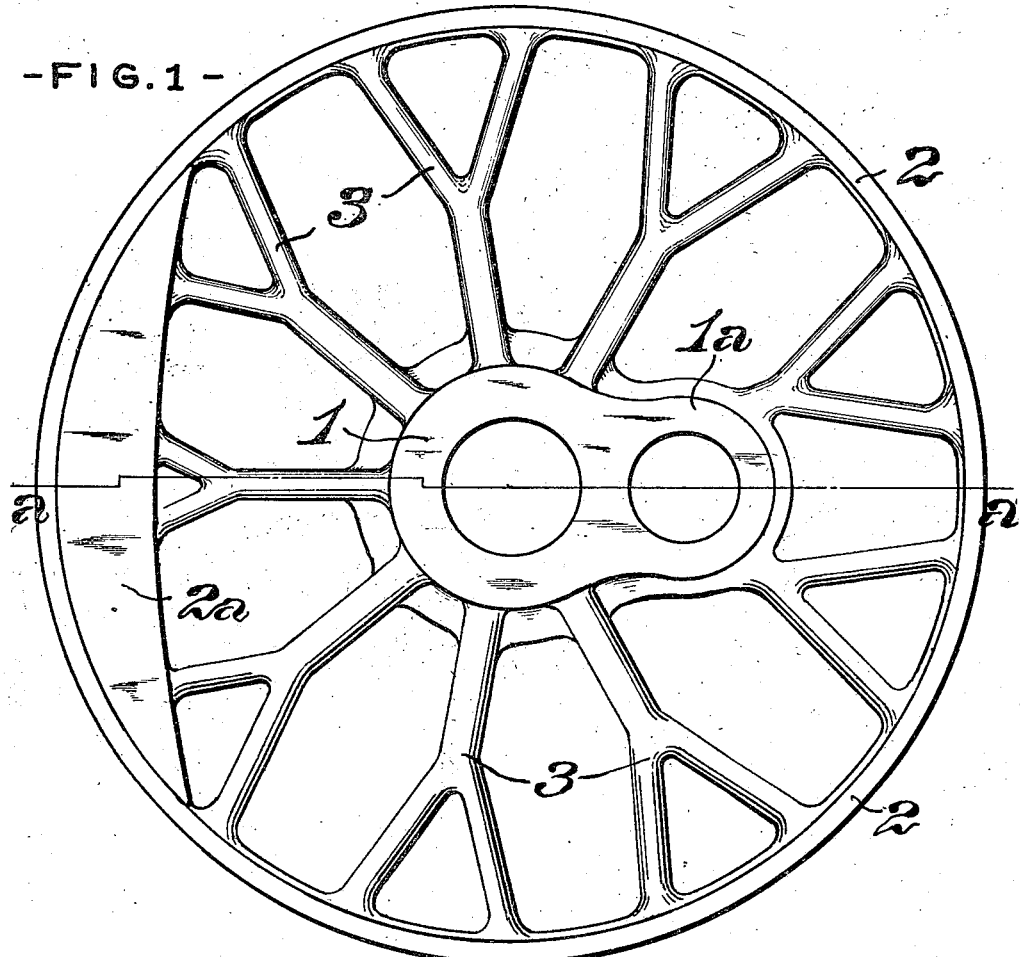
- FIG. 2 -
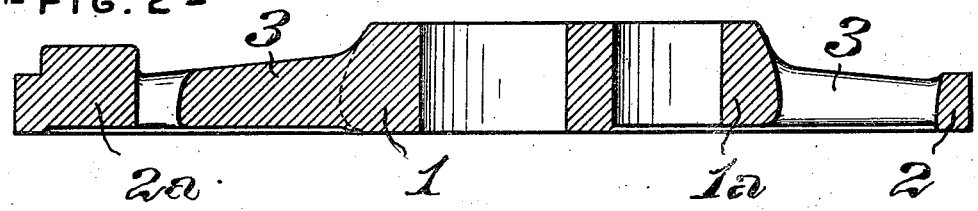
WITNESSES
INVENTOR Patented Oct. 21, 1924.

1,512,433

UNITED STATES PATENT OFFICE.

DAVID VAN ALSTYNE, OF NEW YORK, N. Y.

CAST-METAL WHEEL.

Application filed June 14, 1923. Serial No. 645,287.

*To all whom it may concern:*

Be it known that I, DAVID VAN ALSTYNE, a citizen of the United States, and a resident of New York, in the county and State of New York, have invented a certain new and useful Improvement in Cast-Metal Wheels, of which improvement the following is a specification.

My invention relates generally to wheels of cast metal for comparatively heavy vehicles, and more particularly to locomotive driving wheels, and its object is to provide a wheel of such general type in the manufacture of which stresses at the junction of the hub and spokes, due to the cooling shrinkage of the metal, shall be materially reduced, and a corresponding increase in the number of sound castings produced shall be attained.

The improvement claimed is hereinafter fully set forth.

In the accompanying drawing: Figure 1 is a view, in elevation, of a locomotive driving wheel, illustrating an application of my invention, and, Fig. 2, a diametral section through the same, on the line $a\ a$ of Fig. 1.

In the practice of my invention, referring descriptively to the specific embodiment thereof which is herein exemplified, I construct, by casting in iron or steel, a wheel which, as in ordinary practice, comprises a central hub, 1, a rim, 2, and a plurality of spokes or arms, 3, connecting the hub and rim. In the case of a locomotive driving wheel, as shown herein, a crank pin hub, $1^a$, connected, by a body of metal, to the hub, and a counterbalance, $2^a$, connected to the rim, are also formed in the casting.

In present and prior practice, so far as my knowledge and information extend, the connections of the spokes to the hub and to the rim, respectively, of locomotive driving wheels have always been equal in number, that is to say, each spoke extended from the hub to the rim, independently of, and without intermediate connection to, another spoke. As a result of this construction, when a sufficient number of spokes is provided to ensure desired and proper strength in the rim, their union, at the hub, accumulates so large a body of metal round it, as induces detrimental stresses due to its cooling shrinkage, whereby it is often difficult or impracticable to obtain sound castings.

In the practice of my invention, the number of spokes necessary to properly support and strengthen the rim having been determined and adopted, as heretofore, the number of the connections of the spokes to the hub is made fifty per cent less than that of their connections to the rim, by uniting each one of the spokes to an adjacent spoke, between the rim and the hub, instead of extending each spoke, from the rim to the hub, without intermediate connection to another spoke, as is the present practice. The consequent reduction in the accumulation of metal of the spokes around the hub will be obvious, as will also be the advantages of providing a greater space at the junction of the spokes with the hub; wider spaces between the spoke junctions, which, in turn, permits the use of larger fillets between the members; and for equal support of the rim, a lighter total weight of wheel.

As shown in Fig. 1, the spokes are connected about midway between the rim and hub, the members of each pair of connected spokes thus forming a comparatively wide angle, one with the other, and the single member formed by their connection, commencing at a substantial distance from the hub. The two connected spokes of each pair are thus disposed in the form of a Y, the arms of which join the rim of the wheel, and the stem joins the hub.

The crank pin hub and the counterbalance, being substantially parts of the hub and the rim, respectively, the same rule of disposition applies to the spokes which terminate on them.

I claim as my invention and desire to secure by Letters Patent:

A locomotive driving wheel, comprising an axle hub; a rim; a counterbalance; a crank pin hub, and spokes, all cast integral, the spokes joining the hubs to the rim and those joining the axle hub to the counterbalance being bifurcated so as to have two points of junction with the rim and counterbalance and only one with the hubs.

DAVID VAN ALSTYNE.

Witnesses:
J. SNOWDEN BELL,
W. R. WARNER.